United States Patent
Montague

(10) Patent No.: US 9,129,415 B2
(45) Date of Patent: *Sep. 8, 2015

(54) APPEARANCE OF AN OBJECT

(76) Inventor: Roland Wescott Montague, North Saanich (CA)

( * ) Notice: Subject to any disclaimer, the term of this patent is extended or adjusted under 35 U.S.C. 154(b) by 674 days.

This patent is subject to a terminal disclaimer.

(21) Appl. No.: 13/279,669

(22) Filed: Oct. 24, 2011

(65) Prior Publication Data

US 2012/0038636 A1 Feb. 16, 2012

Related U.S. Application Data

(63) Continuation-in-part of application No. 12/826,067, filed on Jun. 29, 2010, now Pat. No. 8,044,976, which is a continuation of application No. 11/279,222, filed on Apr. 10, 2006, now Pat. No. 7,773,100.

(51) Int. Cl.
| | |
|---|---|
| *G09G 5/00* | (2006.01) |
| *G06T 15/00* | (2011.01) |
| *G06T 3/60* | (2006.01) |
| *G06F 3/0484* | (2013.01) |
| *G06T 19/20* | (2011.01) |

(52) U.S. Cl.
CPC .............. *G06T 3/60* (2013.01); *G06F 3/04845* (2013.01); *G06T 19/20* (2013.01); *G06T 2210/36* (2013.01); *G06T 2219/2016* (2013.01)

(58) Field of Classification Search
CPC ............................................ G09G 5/00–5/008
USPC ........................... 345/619, 649, 650, 653, 655
See application file for complete search history.

(56) References Cited

U.S. PATENT DOCUMENTS

| | | |
|---|---|---|
| 6,417,836 B1 | 7/2002 | Kumar et al. |
| 2002/0050988 A1 | 5/2002 | Petrov et al. |
| 2005/0195216 A1 | 9/2005 | Kramer et al. |
| 2006/0077211 A1 | 4/2006 | Zhou |
| 2006/0181550 A1* | 8/2006 | Nohara .................. 345/648 |

FOREIGN PATENT DOCUMENTS

| | | |
|---|---|---|
| EP | 0559374 A1 | 8/1993 |
| EP | 0955610 A1 | 11/1999 |
| GB | 2387519 A | 10/2003 |

OTHER PUBLICATIONS

Mark Livingston et al., "Six Degree of Freedom Control with a Two-Dimensional Input Device: Intuitive Controls and Simple Implementations", Hewlett Packard, 1999, pp. 1-6.

* cited by examiner

*Primary Examiner* — Jacinta M Crawford

(57) ABSTRACT

A method and system of displaying and rotating a 3d numeric model. Upon pausing, or completing the rotation by releasing the mouse button, a raster image loads and displays thereby improving the sharpens or allowing the user to zoom in on additional detail. The raster images may be created by photographing the real life version of the object represented by the 3d numeric model. The raster images may otherwise be created by long duration renderings of the 3d numeric model at very high quality settings and mesh size then saving the result to a raster image file. The benefit is smooth rotation inherent to 3d numeric models with the detail and sharpness of photographs after the rotation is completed.

18 Claims, 5 Drawing Sheets

APPEARANCE OF AN OBJECT

This application is a continuation in part of application Ser. No. 12/826,067 now U.S. Pat. No. 8,044,976, which is a continuation of application Ser. No. 11/279,222, now U.S. Pat. No. 7,773,100.

BACKGROUND OF THE INVENTION

The present invention relates to software applications that display images of physical objects from a finite number of angles, and more particularly to a method for increasing the amount of rotation as well as sharpening the image displayed.

In addition the present invention relates to software applications that display 3d numeric models, and more particularly to a method for increasing the realism or quality displayed to the user.

Internet multi-media viewers, such as Quicktime from Apple Computer, provide the experience of rotating a physical object by allowing a user to control which view, of a finite number of views taken from different angles, is to be displayed. Typically, the user will select the rotation mode then press and drag within the application.

Dragging horizontally displays a sequence of views of the object from angles where the value of the longitude coordinate varies. If there is enough data for 360 degree rotation then upon reaching one limit, the sequence continues from the opposite limit giving the appearance of continuous rotation around and around the object.

Dragging vertically displays a sequence of views of the object from angles where the value of the colatitude coordinate varies and stops rotation at an upper limit and a lower limit such that the object always appears right-side-up.

Dragging in a diagonal direction varies the values of both longitude and colatitude coordinates, as one would expect.

There remains a need to improve the user experience by providing both 360 degree rotation where the value of the longitude coordinate varies, and extended rotation where the value of the colatitude coordinate varies such that the object is able to be displayed up-side-down, right-side-up, as well as around and around at the same time.

There remains a second need to improve the user experience by sharpening the image of the object after the rotation is complete or the user performing an additional action.

There remains a third need to improve the user experience of 3d numeric models by increasing the quality or realism of the 3d numeric model after the user completes a rotation operation, after the user pauses a rotation operation, after the user zooms in, or the user performing an additional action.

BRIEF SUMMARY OF THE INVENTION

Accordingly, a first aspect of the present invention provides a method of rotating over the top or bottom of a subject object by defining the next view in sequence as a toggled up-side-down rendering of the view from a longitude angle that is 180 degrees different from the current. The method results in extending the possible rotation to include up-side-down, as well as continuous rotation top over bottom over top such that the object appears right-side-up then up-side-down then right-side-up.

A second and third aspect of the present invention provides a step of sharpening the view displayed by loading in a higher resolution image at the time the rotation is completed, paused, other user actions such as a button press, or as a step of a zoom function.

A fourth aspect of the present invention provides a step of increasing the realism of a 3d numeric model by loading in a raster image at the time the rotation is completed, paused, other users actions such as buttons press, or as a step of a zoom function.

Other novel features of the present invention are apparent from the summary, detailed description, claims, and attached drawings.

BRIEF DESCRIPTION OF THE DRAWINGS

In drawings which help illustrate the present invention.

In all figures, like reference numerals represent the same or identical components of the present invention.

DETAILED DESCRIPTION OF THE PREFERRED EMBODIMENTS

Figure 1:
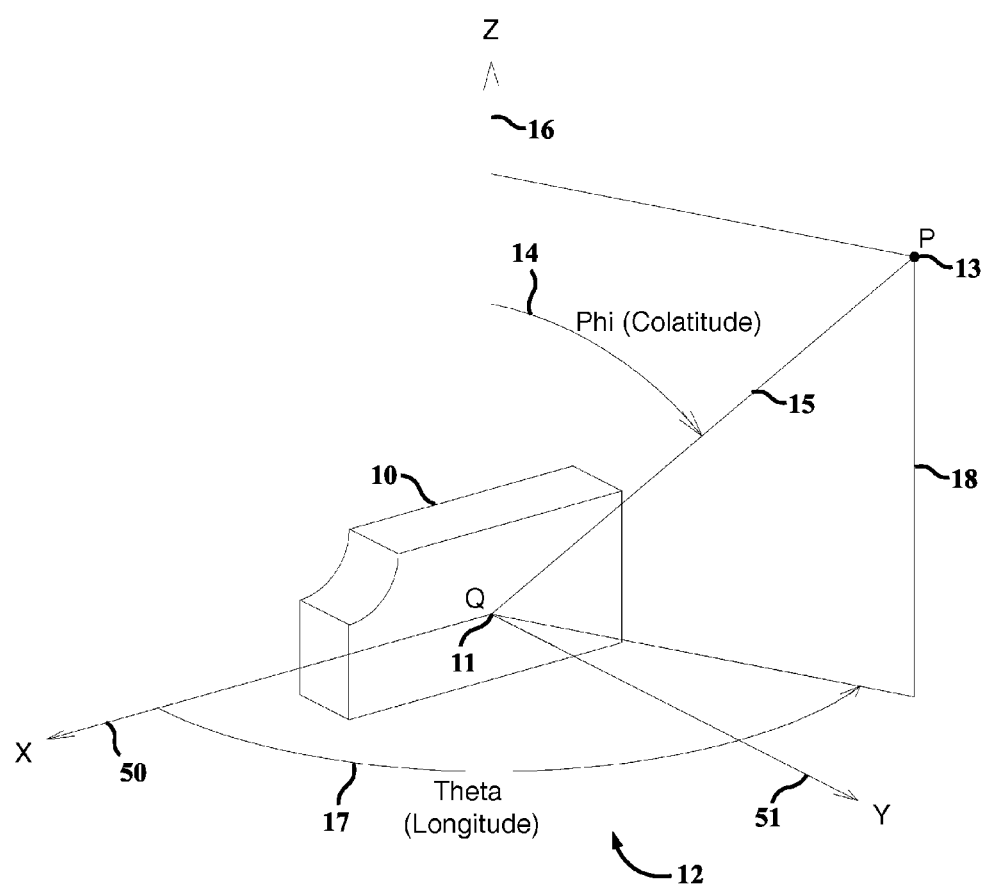
FIG. 1 is an isometric of an object in a spherical coordinate system.

FIG. 1 shows a 3-dimensional subject object 10 at a origin Q 11 of a spherical coordinate system 12 and a point P 13 from which object 10 is viewed. In the system of spherical Coordinates 12 point P 13 in 3-space is represented by an ordered triple (R, Phi, Theta) where R is the distance from P 13 to origin Q 11. An angle Phi 14 is the angle a radial line QP 15 makes with the positive direction of a z-axis 16, and an angle Theta 17 is the angle between a plane 18, containing P 13 and z-axis 16, and an xz-plane containing z-axis 16 and an x-axis 50. For further understanding, the Phi-surfaces (Phi=constant) are circular cones with z-axis 16 as axis; and the Theta-surfaces (Theta=constant) are vertical planes containing z-axis 16. Phi 14 is frequently referred to as the current value of the colatitude coordinate, and Theta 17 is the current value of the longitude coordinate.

Figure 2:
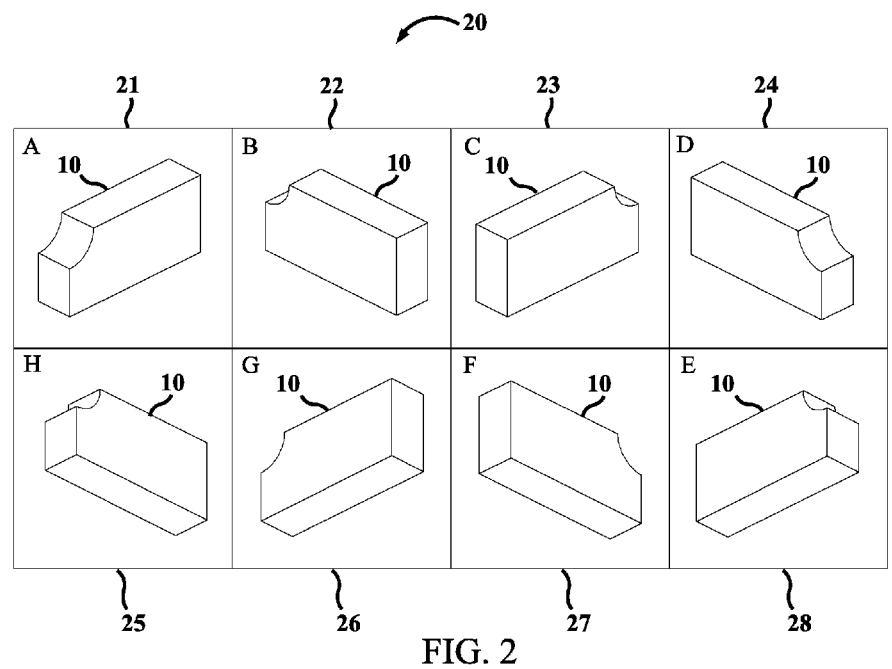
FIG. 2 is a graphical representation of a finite number views of an object stored in a data file.

FIG. 2 shows a simplified example of a graphical representation of data in a rectangular table 20 form storing 4×2 two dimensional views as seen from point P 13 to subject object 10. The top row, A to D, holds Phi 14 constant at 45 degrees and Theta 17 varies such that in view A 21 Theta=45, in view B 22 Theta=135, in view C 23 Theta=225, and in view D 24 Theta=315 degrees. Similarly, the bottom row, E to H, holds Phi 14 constant at 135 degrees and Theta 17 varies such that in view H 25 Theta=45, in view G 26 Theta=135, in view F 27 Theta=225, and in view E 28 Theta=315 degrees. The preferred number of views for an actual implementation of the present invention is 16×8 and will likely increase as technology becomes faster.

When a rotate mode is active, a user may manipulate a keyboard or a pointer device such that a desired sequence of the views displays on a screen. Typically, the current view is contiguous (including diagonal) with the previous view. Prior art has shown continuous rotation around z-axis 16 (by varying Theta 17) may be achieved by jumping from one end of a row to the other end of the same row. Such an action results in the following sequence of views, A 21, B 22, C 23, D 24, A 21, B 22, C 23, D 24, A 21, B 22 . . . . Similarly, rotating in the opposite direction is achieved by D 24, C 23, B 22, A 21, D 24, C 23, B 22, A 21, D 24, C 23 . . . and so forth for different rows. In the prior art, varying Phi 14 results in sequences in a column of the table, such as A 21 to H 25 or G 26 to B 22. However, the user reaches a limit of rotation at a downward looking view with Phi 14 at a minimum and reaches a limit at an upward looking view with Phi 14 at a maximum (but less than 180 degrees). There remains a need to tumble subject object 10 top over bottom over top to provide the appearance of limitless rotation similar to a user's hand holding and turning the physical subject object 10 for further inspection from any angle.

Figure 3:
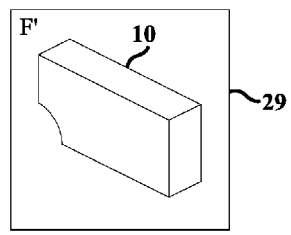
FIG. 3 shows view F' as an up-side-down version of view F.
Figure 4:
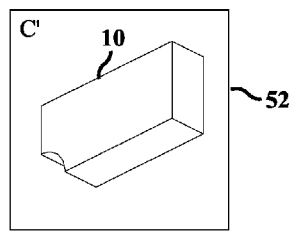
FIG. 4 shows view C' as an up-side-down version of view C.

According to the first aspect of the present invention, referring to FIGS. 2, 3 and 4, tumbling subject object 10 bottom over top over bottom over top, is achieved by a function controlling the sequence of views such as, A 21, H 25, F' 29, C' 52, A 21, H 25, F' 29 . . . , where view F' 29 is view F 27 rotated in plane by 180 degrees such that the image in the original view F 27 is up-side-down. Similarly, view C' 52 is an up-side-down version of view C 23. Some other sequences are B, G, E', D', B . . . ; C, F, H', A', C . . . ; H, A, C', F', H . . . ; F', H, A, C', F' . . . ; and so on. In a general system, a method comprises the steps of detecting the reaching of one end of a first column in table 20, determining the next view in sequence requires a jump to the same end of a second column that represents a Theta 17 value approximately 180 degrees different from the first column, where continued rotation in the same direction results in a sequence in the second column that is opposite in direction compared to the first column and every time a jump is required the view is toggled between rendering the images up-side-down and right-side-up.

An alternate explanation of the first aspect of the present invention is a function, having inputs Phi 14 and Theta 17, which determines the view to display. The function has the characteristic that if phi 14 is greater than 180 degrees then the image displayed is an up-side-down rendering of the view from a colatitude value of 360 degrees minus Phi 14 and a longitude value of 180 degrees from Theta 17. Whereby tumbling object 10 bottom over top over bottom over top results from the user sweeping Phi 14 through 0 to 360 then 0 to 360 degrees.

A second aspect of the present invention is the additional step of loading in and displaying a higher resolution image of the current view when the user completes the rotation by releasing a mouse button at the end of a drag. The user may now activate a zoom function for closer inspection with sharper detail than otherwise available.

Figure 5:
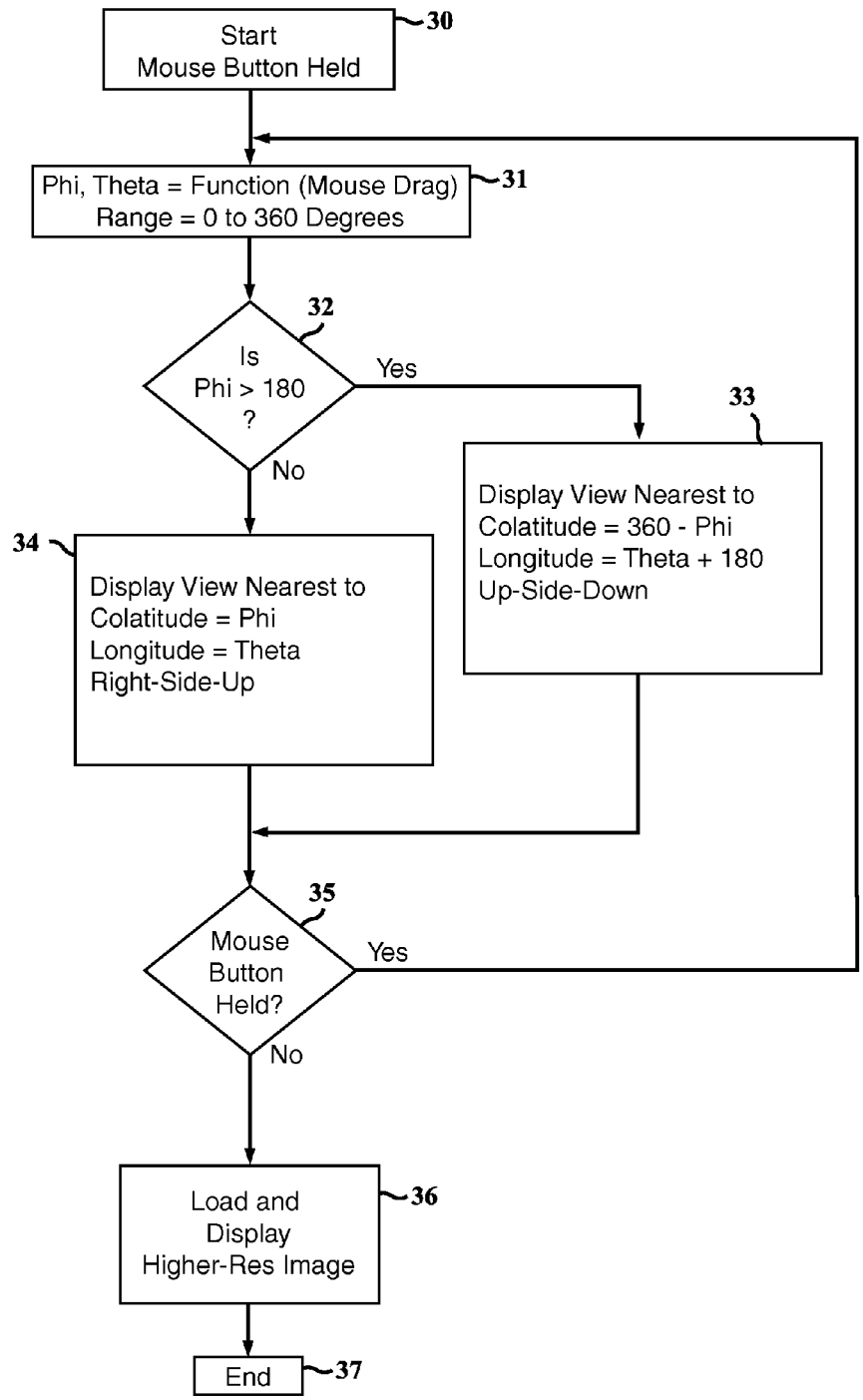
FIG. 5 is a flow chart of the present invention.

The flowchart shown in FIG. 5 describes the operation of the present invention. The rotation is started 30 upon the user activating the rotate mode by clicking an icon or selecting from a pull-down or pop-up menu, then pressing and holding the mouse button to begin a drag. In step 31, Phi 14 and Theta 17 values update in proportion to mouse movements. The valid ranges are from 0 to 360 degrees where increasing above 360 degrees results in restarting at 0 degrees, and decreasing below 0 degrees results in restarting at 360 degrees. The restarting behavior is also present in step 33. In step 32, if Phi 14 is greater than 180 degrees then the flow branches to step 33, otherwise branches to step 34. In step 33, an up-side-down rendering of the view nearest to having colatitude=(360−Phi) and longitude=(Theta+/−180) is displayed then continues to step 35. In step 34, a right-side-up rendering of the view nearest to having colatitude=Phi 14 and longitude=Theta 17 is displayed then continues to step 35. In step 35, if the user continues to hold the mouse button then the flow branches back to step 31 for further rotation, otherwise the flow branches to step 36. In step 36, a higher resolution version of the current view loads and displays then continues to the ending step 37.

Alternatively, subject object 10 may be viewed from varying amounts such as only from above the plane on which it rests. In such a case, the valid range of Phi 14 is approximately 90 to 0 and 360 to 270, where incrementally increasing greater than 90 degrees or decreasing less than 270 degrees is not permitted. Rotating object 10 top over bottom (such that the object is up-side-down) is still valid and follows the teachings in step 33.

A third aspect of the present invention provides a step of sharpening the view displayed by loading in a higher resolution image at the time either a rotation is paused, other user actions such as a button click, icon click, or as a step of a zoom function. The zoom function may behave such that zooming in closer than a predetermined limit causes the higher resolution image to load and display. Alternatively, if a computer system's resources allow, after the initial table 20 of views is loaded, all possible higher resolution images, or a portion thereof, may be loaded in a background thread and be displayed (if available) during normal rotation.

A fourth aspect of the present invention relates to software applications that display 3d numeric models. 3d numeric models can be made up of point clouds of pixel colors, where each point in the cloud will typically have a color and xyz co-ordinates. Other typical 3d numeric model schemes involve points with xyz co-ordinates that are formed into triangular meshes with texture maps wrapped onto the surface of the mesh.

A user can rotate a 3d model on a display screen with a number of different input devices, dragging a mouse, using a finger on a touch screen, turning a knob, or even making gestures with body parts in front of a video camera. The input device affects the current angle that the 3d numeric model is displayed to the user.

As the 3d numeric model is rotated, a processor will calculate new renders of the model at the current angle. Any arbitrary current angle can be displayed to the user. The more detailed the 3d model the longer it takes to render so quality of detail is often lowered to make a rendering that can be calculated in a reasonable amount of time such as 5 seconds.

The fourth aspect of the present invention is to load a raster image of a previously rendered 3d numeric model rather than calculating it when needed. A raster image angle is the current angle of the 3d numeric model at the time the rendering was calculated and saved as a raster image. A raster image is a data structure representing a generally rectangular grid of pixels. Raster images are stored in image files with varying formats. It can be appreciated that only a limited number of raster images can be created and stored such as 120 up to 1000.

Instead of creating the raster images by rendering a 3d numeric model, a real life version of the physical object can be photographed from the 120 different angles, and the resulting raster images will have the associated raster image angles at the time of photography. The real life physical object could be a running shoe and the 3d numeric model can be created by scanning the running shoe with lasers. In order to lower the rendering time and reduce the file size, the meshing of the shoe laces are not typically included in the 3d numeric model version and therefore detail is lost.

This fourth aspect of the present invention allows for the smooth rotation inherent of a 3d numeric model while the user is in the middle of a rotate operation such as holding a mouse button and dragging. When the user completes the rotate operation by releasing the mouse button then a raster image is loaded and displayed overtop. The particular raster image to be loaded will have a raster image angle that is nearest to the current angle that the 3d numeric model was displayed at.

The raster image angle will not be exactly the same as the current angle used to display the 3d numeric model, therefore a small jerk in rotation will be apparent when the raster image is displayed. To eliminate this jerky rotation, the current angle for the 3d model is slowly changed to that of the raster image angle before the raster image is displayed. This slow rotation is automatically performed by the viewer software by iterating the current angle closer and closer to the raster image angle until they are equivalent. On each iteration the 3d numeric model is displayed at the new current angle.

Figure 7:
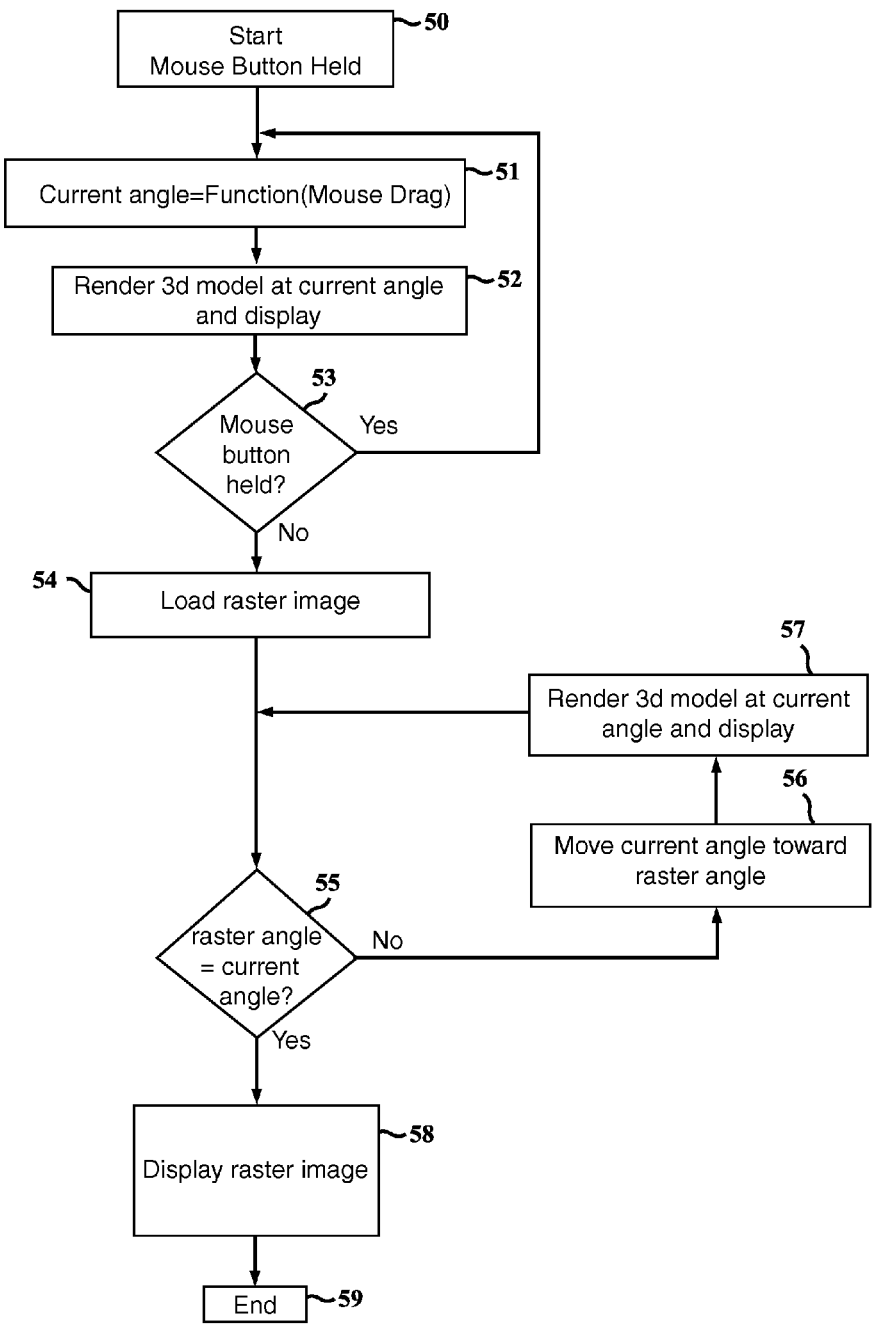
FIG. 7 is a flow chart of the 3d numeric model aspect of present invention.

The flowchart shown in FIG. 7 describes the operation of this aspect of the present invention. The rotation is started 50 upon the user activating the rotate mode by clicking an icon or selecting from a pull-down or pop-up menu, then pressing and holding the mouse button to begin a drag. In step 51 the current angle updates in proportion to mouse movements. The current angle comprising of Phi 14 and theta 17 components. In step 52 the 3d numeric model is rendered at the current angle and displayed on the display screen 40 by way of a micro processor 41 or a dedicated graphics card. In step 53, if the user continues to hold the mouse button then the flow branches back to step 51 for further rotation, otherwise the flow branches to step 54. In step 54 a raster image is loaded from a nontransitory storage device. The raster image having a raster image angle recorded at the time of creation of the raster image. In step 55, if the raster image angle is equivalent to the current angle then the flow branches to step 58, otherwise the flow branches to step 56. In step 56, the current angle is moved closer toward the raster image angle. In step 57, the 3d numeric model is rendered at the new current angle and displayed on the display screen 40 then continues back to step 55. This loop of 55, 56, and 57, continues and slowly rotates the 3d numeric model to the same angle as the raster image was created. Once the raster angle is equivalent to the current angle, in step 58 the raster image is displayed over top of the 3d numeric model so that the user may see more accurate detail, particularly when the user later zooms in for a closer look.

As disclosed earlier, the raster images can be photographs of a real life version of the 3d numeric model. The raster images can also be created by previously rendering the 3d numeric model from preset angles. The creation of the raster images by rendering can occur in a background thread and stored in a transitory storage device such as a memory buffer. This can occur when the viewer first loads the 3d numeric model, or when the viewer is idle. The creation of the raster images by rendering 3d model at preset angles can occur previously on a different computer and be saved to a nontransitory storage device such as a hard drive or DVD. Therefore the raster images can be loaded when needed from a transitory storage device, or loaded from a nontransitory storage device, or loaded from a file server on the internet.

The trigger that begins a function to load and display the raster image having a raster image angle nearest to the current angle can be an input device action that results in completing a rotation operation such as releasing a mouse button at the end of a drag while a rotation operation is active. The trigger may be an input device action that results in pausing a rotation operation such as stopping the motion of a drag for 1 second while a rotation operation is active, or in the case of the input device being a knob the turning motion may be stopped for 1 second to trigger the loading and displaying of the raster image nearest to the current angle. The raster image loading trigger may be an input device action that results in zooming in, such as releasing a mouse button after dragging a box around an area of interest, or using the scroll wheel to zoom in closer than a predetermined amount. Other raster image loading triggers may be an input device action such as pressing a button on a keyboard, or moving a pointer over a toolbar and clicking, or gesturing body parts in front of a video camera, or touching dragging and releasing a touch screen display.

Figure 6:
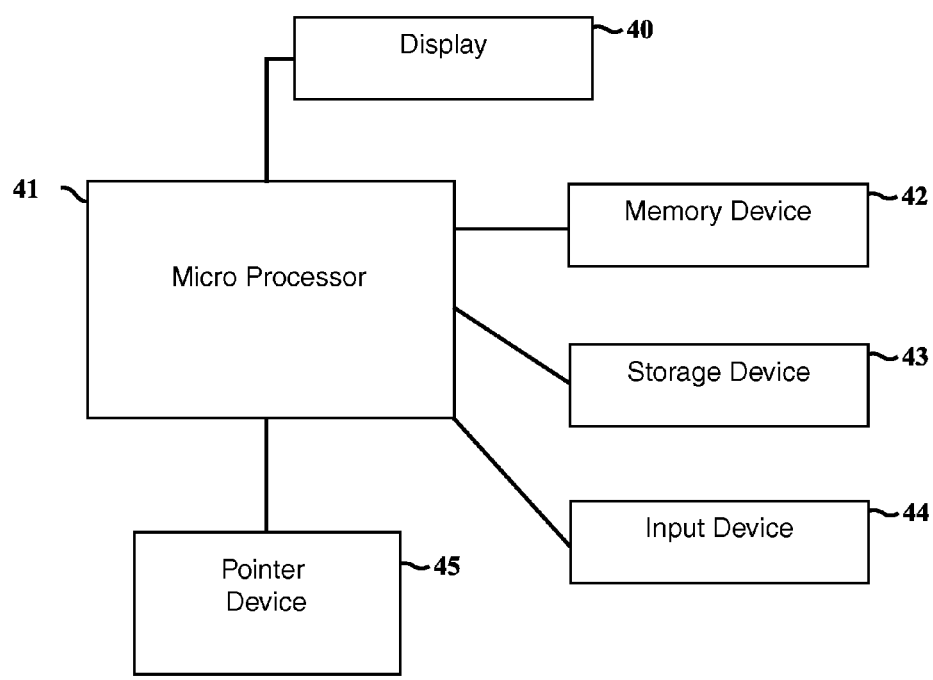
FIG. 6 is a diagram of a typical computer system.

Referring now to FIG. 6, a software application utilizing the present invention would typically run on an electronic device such as a computer system, phone, or game console. The electronic device typically comprises a display screen 40, one or more microprocessors 41, a memory device 42, a storage device 43, an input device 44, and a pointer device 45. Microprocessor 41 communicates with memory device 42, storage device 43, input device 44, pointer device 45, and updates graphics displayed on display screen 40. Storage device 43 may be a hard-drive, internet connection, flash ram, etc. input device 44 may be a keyboard, remote button, touch screen area with character recognition, etc. Pointer device 45 may be a mouse, touch screen, touch pad, tablet, track ball, eye tracker, accelerometer, joystick, etc. Releasing a mouse button to complete a drag is equivalent to removing a stylus from a touch screen, and similar actions involving general pointer devices 45. Input device 44 may also be pointer devices such as a mouse, touch screen, touch pad, tablet, track ball, eye tracker, accelerometer, joystick, gesture detecting video camera, etc.

The present invention's teachings may be implemented in any general purpose application such as, but not limited to, internet browsers, publication packages, presentation packages, medical image packages, as well as non-interactive animations or movies where a user has little or no control. The animations may be of a predetermined or a random direction change pattern of rotation where a time delay controls the speed between frames.

Storage of the views may be arranged in many patterns such as: in a rectangular table 20 form; a linear form of views from A through to H (21, 22, 23, 24, 28, 27, 26, 25) whereby video compression and streaming techniques may be better utilized; a random ordering with a lookup table where security is improved; a plural of smaller rectangular tables to reduce the wait time for the first image to display; or a combination of these or other forms.

One may acquire the images of the views of object 10 through various digitizing means including, but not limited to, use of a digital camera, or renderings of a 3D computer model of the subject object.

It will be apparent to one skilled in the art that spherical coordinate system 12 may be orientated in any arbitrary direction, such that a colatitude coordinate is the angle radial line QP 15 makes with the positive direction of an x-axis 50, and a longitude coordinate is the angle between a plane containing P 13 and x-axis 50, and a xy-plane containing x-axis 50 and a y-axis 51.

Thus, the present invention provides a method of extending the amount of rotation of an object. When rotating over the top, a view of the backside is displayed up-side-down and continued rotation over the original bottom results in the object appearing right-side-up. The user experience therefore improves such that continuous rotation of top over bottom over top is possible. In addition, pausing or completing the rotation results in the display of a higher resolution image to improve sharpness or enhance the ability to zoom in closer and show additional detail. In addition, a raster image of real life version of a 3d numeric model can be loaded and displayed after pausing or completing a rotation operation to improve the appearance of an object or enhance the ability to zoom in closer and show additional detail.

Specific preferred embodiments of the present invention are described hereinabove; it is to be understood that the invention is not limited to those particular embodiments, and one skilled in the art may make various changes and modifications without departing the form the scope or the spirit of the invention as it is defined in the attached claims.

What is claimed is:

1. A system for rotating an object comprising:
   a. a first means for calculating a first render of a 3d numeric model of said object at a current angle;
   b. a display means for displaying said first render;
   c. a third means comprising an input device for receiving an input device action; and
   d. a fourth means for determining a raster image and displaying said raster image in place of said first render on said display means in response to said input device action, said raster image having a raster image angle nearest to said current angle;
   wherein said input device action results in completing a rotation operation of said 3d numeric model;
   whereby a user can press-drag to affect said current angle in order to rotate in different directions as said display means is updated with new first renders and said user completes the rotation operation by releasing which triggers said fourth means for displaying said raster image on said display means that is nearest to said current angle;
   whereby said object is displayed at a higher quality but at an angle that is different than said current angle.

2. The system as recited in claim 1, wherein said raster image is a photograph of a real life version of said 3d numeric model.

3. The system as recited in claim 2, wherein said input device action results in pausing a rotation operation of said 3d numeric model;
   whereby the user can move the input device to rotate and then pausing the rotation operation which triggers said fourth means for displaying said raster image on said display means that is nearest to said current angle.

4. The system as recited in claim 3, wherein before said fourth means displays said raster image on said display means, said current angle is automatically iterated to be equivalent to said raster image angle;
   whereby after pausing the motion of the input device said 3d numeric model smoothly rotates itself to said raster image angle before said fourth means displays said raster image on said display means to avoid the appearance of jerky motion.

5. The system as recited in claim 2, wherein said input device action results in zooming in;
   whereby the user can press-drag to draw a box and release to zoom in on an area of interest which triggers said fourth means for displaying said raster image on said display means that is nearest to said current angle.

6. The system as recited in claim 2, wherein said raster image is loaded from an Internet.

7. The system as recited in claim 2, wherein said raster image is loaded from a non-transitory storage device.

8. The system as recited in claim 1, wherein said raster image is a second rendering where said second rendering was previously calculated and stored on a storage device;
   whereby said raster image shows more detail than said first render.

9. The system as recited in claim 8, wherein said raster image is loaded from a non-transitory storage device.

10. The system as recited in claim 8, wherein said raster image is loaded from an internet.

11. The system as recited in claim 8, wherein said raster image is loaded from a transitory storage device;
    whereby said second rendering is said 3d numeric model rendered into raster image form at a number of different preset angles in a background thread and stored in transitory memory.

12. The system as recited in claim 1, wherein before said fourth means displays said raster image on said display means, said current angle is automatically iterated to be equivalent to said raster image angle;
    whereby after releasing the input device said 3d numeric model smoothly rotates itself to said raster image angle before said raster image is shown on said display means to avoid the appearance of jerky motion.

13. The system as recited in claim 1, wherein before said fourth means displays said raster image on said display means, said current angle is automatically iterated to be equivalent to said raster image angle;
    whereby said 3d numeric model smoothly rotates itself to said raster image angle before said fourth means displays said raster image on said display means to avoid the appearance of jerky motion.

14. A method for rotating an object comprising:
    a. calculating a first render of a 3d numeric model of said object at a current angle;
    b. displaying said first render on a screen of an electronic device;
    c. receiving an input device action; and
    d. determining a raster image and displaying said raster image in place of said first render on said screen in response to said input device action, said raster image having a raster image angle nearest to said current angle;
    wherein said input device action results in completing a rotation operation of said 3d numeric model;
    whereby a user can press-drag to affect said current angle in order to rotate in different directions as said screen is updated with new first renders and said user completes the rotation operation by releasing which triggers displaying said raster image on said screen that is nearest to said current angle;
    whereby said object is displayed at a higher quality but at an angle that is different than said current angle.

15. The method as recited in claim 14,
    wherein said raster image is a second rendering, said second rendering was previously calculated and stored on a storage device;
    whereby said raster image shows more detail than said first render.

16. A software application tangible embodied in a non-transitory storage device having a plurality of instruction executable by a computer embodies therein, wherein said plurality of instructions when executed cause the computer to perform a method for rotating a 3d numeric model comprising:
    a. displaying a first render of said 3d numeric model at a current angle on a screen;
    b. receiving an input device action;
    c. determining a raster image and displaying said raster image in place of said first render on said screen in response to said input device action, said raster image having a raster image-angle nearest to said current angle;
    wherein said input device action results in completing a rotation operation of said 3d numeric model;
    whereby a user can press-drag to affect said current angle in order to rotate in different directions as said screen is updated with new first renders and said user completes the rotation operation by releasing which triggers displaying said raster image on said screen that is nearest to said current angle;

whereby said object is displayed at a higher quality but at an angle that is different than said current angle.

17. The software application as recited in claim 16, wherein said raster image is a photograph of a real life version of said 3d numeric model.

18. The software application as recited in claim 17, wherein before said screen displays said raster image, said current angle is automatically iterated to be equivalent to said raster image angle;

whereby after releasing the input device said 3d numeric model smoothly rotates itself to said raster image angle before said screen displays said raster image on said screen to avoid the appearance of jerky motion.

* * * * *